United States Patent
Kessels

(10) Patent No.: US 12,450,761 B2
(45) Date of Patent: Oct. 21, 2025

(54) IMAGING ARRANGEMENT AND CORRESPONDING METHODS AND SYSTEMS FOR DEPTH MAP GENERATION

(71) Applicant: LUMILEDS LLC, San Jose, CA (US)

(72) Inventor: Marcus Jozef Henricus Kessels, Echt (NL)

(73) Assignee: Lumileds Singapore Pte. Ltd., Singapore (SG)

( * ) Notice: Subject to any disclaimer, the term of this patent is extended or adjusted under 35 U.S.C. 154(b) by 430 days.

(21) Appl. No.: 17/925,573

(22) PCT Filed: May 14, 2021

(86) PCT No.: PCT/US2021/032583
§ 371 (c)(1),
(2) Date: Nov. 15, 2022

(87) PCT Pub. No.: WO2021/231947
PCT Pub. Date: Nov. 18, 2021

(65) Prior Publication Data
US 2023/0206478 A1   Jun. 29, 2023

Related U.S. Application Data

(60) Provisional application No. 63/025,628, filed on May 15, 2020.

(30) Foreign Application Priority Data

Jul. 22, 2020   (EP) .................................... 20187221

(51) Int. Cl.
*G01S 17/931*   (2020.01)
*B25J 9/16*   (2006.01)
(Continued)

(52) U.S. Cl.
CPC ............... *G06T 7/50* (2017.01); *B25J 9/1664* (2013.01); *G06T 7/70* (2017.01); *G06V 10/141* (2022.01);
(Continued)

(58) Field of Classification Search
CPC . G06T 7/50; G06T 7/70; B25J 9/1664; G06V 10/141; G06V 10/60; G06V 10/761;
(Continued)

(56) References Cited

U.S. PATENT DOCUMENTS

2017/0272651 A1   9/2017   Mathy et al.
2018/0356501 A1*  12/2018   Send ..................... H10F 77/957
(Continued)

FOREIGN PATENT DOCUMENTS

KR   2019-0092957 A   8/2019
KR   2020-0039419 A   4/2020
(Continued)

OTHER PUBLICATIONS

International Search Report and Written Opinion mailed Sep. 6, 2021 for PCT International Application No. PCT/US2021/032583.
(Continued)

*Primary Examiner* — Vu Le
*Assistant Examiner* — Lei Zhao
(74) *Attorney, Agent, or Firm* — Volpe Koenig

(57) ABSTRACT

An imaging system includes multiple LED modules, a single image sensor, a controller, a processing unit and a depth map generator. Each LED module has a distinct angular emission profile and emits light having a distinct wavelength range. The image sensor detects light originating from at least two of the LED modules after reflection by an object in a field of view of the image sensor to provide an image sensor output. The controller controls the LED modules to turn on and off such that only one LED module emits light at a time.
(Continued)

The processing unit processes the image sensor output to identify an intensity profile for the reflected light from each of the LED modules. The depth map generator determines an angular position of the object based at least on the intensity profile for the reflected light from each of the LED modules.

18 Claims, 5 Drawing Sheets

(51) Int. Cl.
    *G01S 7/4863*     (2020.01)
    *G01S 17/894*     (2020.01)
    *G06T 7/50*     (2017.01)
    *G06T 7/70*     (2017.01)
    *G06V 10/141*     (2022.01)
    *G06V 10/60*     (2022.01)
    *G06V 10/74*     (2022.01)
    *H05B 45/10*     (2020.01)

(52) U.S. Cl.
    CPC ............ *G06V 10/60* (2022.01); *G06V 10/761* (2022.01); *H05B 45/10* (2020.01)

(58) Field of Classification Search
    CPC ..... H05B 45/10; G01S 17/931; G01S 7/4863; G01S 17/894; G01S 7/4815
    See application file for complete search history.

(56) References Cited

U.S. PATENT DOCUMENTS

2019/0277971 A1   9/2019   Lee et al.
2020/0096636 A1*   3/2020   Kuroda ............. B60R 21/01534

FOREIGN PATENT DOCUMENTS

WO     2014/106843 A2     7/2014
WO     WO-2019207588 A2 *   10/2019   ......... A61B 1/00163

OTHER PUBLICATIONS

Extended European Search Report dated Jun. 12, 2024 for European Patent Application No. 21803782.8.
International Preliminary Report on Patentability Chapter I issued Nov. 15, 2022 for PCT International Application No. PCT/US2021/032583.
Extended European Search Report dated Dec. 14, 2020 for European Patent Application No. 20187221.5.

* cited by examiner

IMAGING ARRANGEMENT AND CORRESPONDING METHODS AND SYSTEMS FOR DEPTH MAP GENERATION

CROSS REFERENCE TO RELATED APPLICATIONS

This application is a § 371 application of International Application No. PCT/US2021/032583, filed May 14, 2021, which claims the benefit of U.S. Provisional Patent Application No. 63/025,628, which was filed on May 15, 2020, and European Application Number 20187221.5, which was filed on Jul. 22, 2020, the contents of which are hereby incorporated by reference herein.

BACKGROUND

A camera system may include a time-of-flight (TOF) arrangement to obtain a depth map of the region in front of the camera's image sensor. When a large image sensor is used, an accurate depth map can be obtained, for example to perform face recognition or to determine the optimum distribution of light required to illuminate a scene prior to taking a photograph of the scene.

SUMMARY

An imaging system includes multiple LED modules, a single image sensor, a controller, a processing unit and a depth map generator. Each LED module has a distinct angular emission profile and emits light having a distinct wavelength range. The image sensor detects light originating from at least two of the LED modules after reflection by an object in a field of view of the image sensor to provide an image sensor output. The controller controls the LED modules to turn on and off such that only one LED module emits light at a time. The processing unit processes the image sensor output to identify an intensity profile for the reflected light from each of the LED modules. The depth map generator determines an angular position of the object based at least on the intensity profile for the reflected light from each of the LED modules.

BRIEF DESCRIPTION OF THE DRAWINGS

A more detailed understanding can be had from the following description, given by way of example in conjunction with the accompanying drawings wherein.

DETAILED DESCRIPTION

Figure 1:
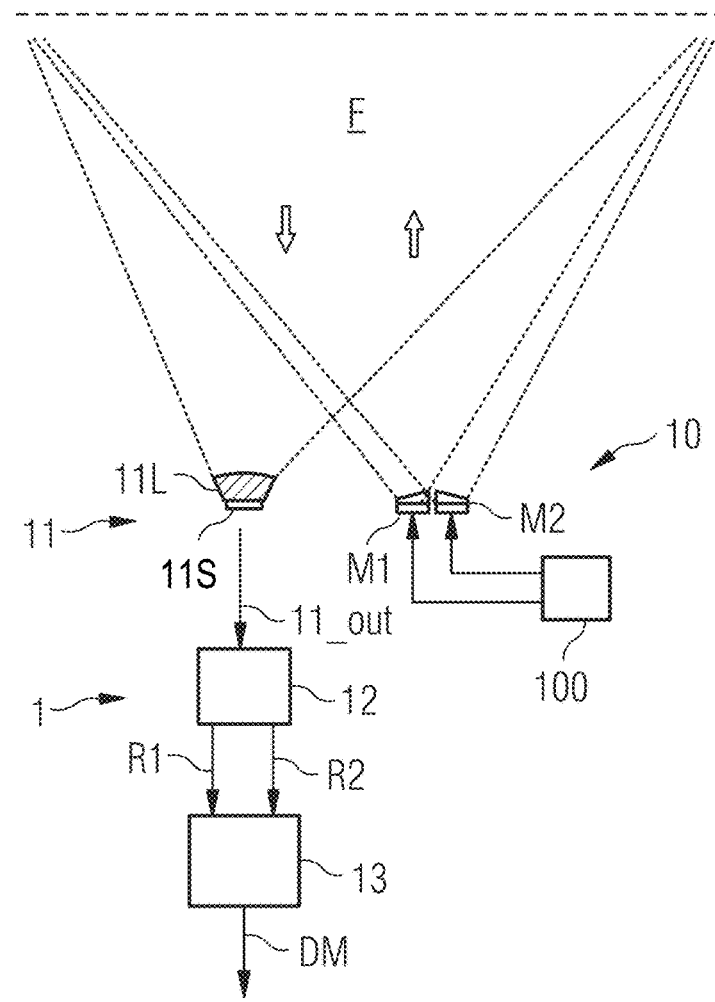
FIG. 1 is a block diagram of an example TOF imaging arrangement.

Examples of different light illumination systems and/or light emitting diode ("LED") implementations will be described more fully hereinafter with reference to the accompanying drawings. These examples are not mutually exclusive, and features found in one example may be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, third, etc. may be used herein to describe various elements, these elements should not be limited by these terms. These terms may be used to distinguish one element from another. For example, a first element may be termed a second element and a second element may be termed a first element without departing from the scope of the present invention. As used herein, the term "and/or" may include any and all combinations of one or more of the associated listed items.

It will be understood that when an element such as a layer, region, or substrate is referred to as being "on" or extending "onto" another element, it may be directly on or extend directly onto the other element or intervening elements may also be present. In contrast, when an element is referred to as being "directly on" or extending "directly onto" another element, there may be no intervening elements present. It will also be understood that when an element is referred to as being "connected" or "coupled" to another element, it may be directly connected or coupled to the other element and/or connected or coupled to the other element via one or more intervening elements. In contrast, when an element is referred to as being "directly connected" or "directly coupled" to another element, there are no intervening elements present between the element and the other element. It will be understood that these terms are intended to encompass different orientations of the element in addition to any orientation depicted in the FIGs.

Relative terms such as "below," "above," "upper,", "lower," "horizontal" or "vertical" may be used herein to describe a relationship of one element, layer, or region to another element, layer, or region as illustrated in the FIGs. It will be understood that these terms are intended to encompass different orientations of the device in addition to the orientation depicted in the Figures.

There are various ways of constructing a TOF arrangement. In one approach, a TOF arrangement may comprise a light source and a detector that is sensitive to the wavelength or wavelengths of light emitted by the light source. In order to make the time-of-flight measurement unobtrusive, a light source may be an infra-red (IR) emitter, such as an assembly of one or more IR-LEDs. The elapsed time between emitting a light pulse and detecting the reflected light may be measured and used to compute the distance to the object from which the light was reflected, for example by analysing a phase difference between the emitted light and the reflected light arriving at the image sensor. Since the imaging arrangement can determine the position of an object in a field of view and also an estimation of the distance to the object, it may also be referred to as a TOF imaging arrangement or TOF camera.

In embodiments described herein, an imaging arrangement may include any number of LED modules, such as three or more LED modules, each with a different angular emission profile. However, the advantages of the embodiments described herein may be more relevant to low-end applications in which high imaging accuracy may not be a priority and for which a simple but economical and reliable vision system may be desirable. For example, an autonomously mobile device, such as an automated robotic household appliance such as a robotic vacuum cleaner that moves independently along a floor and which should avoid bumping into objects, may also use a TOF imaging system to generate a depth map so that the device can see the region in front of it and can navigate a safe route that avoids collision with objects in its path. For such devices, it may be important that the imaging system be economical, accurate and robust. To this end, some TOF camera systems may use a single LED as a light source and a single economical image sensor, such as a single sensor pixel or a one-dimensional array of sensor pixels. However, such an image sensor may have a narrow angular range, typically in the order of only 5°. To cover a larger region, such TOF camera systems may use mechanical elements that swivel the image sensor in order to be able to scan more of the region in front of the device or that direct the LED light source to successively illuminate slices of the region in front of the autonomous device. Such mechanical elements may be prone to failure, for example as a result of wear or as a result of impact or collisions. Accordingly, embodiments described herein may provide a simpler way of detecting the presence of objects in a field of view and may include a smaller number of LED modules, such as two LED modules. Such a basic realization can enable an automated robotic household appliance to obtain sufficient visual information about its surroundings in order to navigate a safe path without collisions. In embodiments, the LED modules may emit in the infrared (IR) range.

FIG. 1 is a block diagram of an example TOF imaging arrangement 1. In the example illustrated in FIG. 1, the TOF imaging arrangement 1 includes a one-dimensional image sensor 11S and focusing optics 11L (also referred to collectively as a camera 11), two LED modules M1 and M2, a controller 100, a processing unit 12 and a depth map generator 13.

In the illustrated example, the plane of a field of view F of the camera 11 is perpendicular to the plane of the page. The field of view of a camera is determined mostly by the sensor size and the focusing optics. In embodiments, the one-dimensional image sensor can be any one or more simple image sensors, such as a one-dimensional image sensor (i.e., comprising a row of image sensor pixels) or a zero-dimensional image sensor (i.e., comprising a single image sensor pixel). In the context of the embodiments described herein, it will be assumed that an image sensor is at most one-dimensional and can also be zero-dimensional. Each image sensor pixel may be configured to collect light from its field of view.

In embodiments, a simple one-dimensional image sensor may be orientated horizontally. The entire scene in the field of view of the camera (illuminated by the LED of an LED module) may then be imaged as a virtual narrow rectangle or strip when reflected light (originating from an LED module) arrives at the one-dimensional image sensor. While any number of pixels is possible, in embodiments, the image sensor may be a one-dimensional array of 30-40 image pixels. An array of this size can result in sufficient information.

Each LED module M1, M2 may include an LED and a beam shaping optic shaped so that each LED module has a distinct angular emission profile (e.g., the angular emission profiles are clearly different from each other). The emission faces of the LEDs and the entry face of the image sensor may be perpendicular to the plane of the page. The LEDs of the of LED modules M1, M2 may emit at distinct wavelengths, which may be considered to cover a narrow range. For example, the LED of the first LED module M1 may emit at 850 nm and the LED of the second LED module M2 may emit at 960 nm. An 850 nm LED may, for example, emit at approximate 850 or 850±30 nm, and a 960 nm LED may emit at approximately 960 or 960±30 nm. In the example illustrated in FIG. 1, the left-hand LED module M1 is configured to cast most of its light to the left of the field of the view F of the camera 11, while the right-hand LED module M2 is configured to cast most of its light to the right of the field of view F.

The angular emission profile of an LED module can be achieved by the LED. However, it may be easier to alter the emission profile of an LED by placing a suitably shaped optical element over the emission face of the LED die. Therefore, in some embodiments, the angular emission profile of an LED module may be determined primarily by the optical element of that LED module. For example, a planar LED die with a Lambertian emission profile can be used, and a suitably shaped optical element can convert this Lambertian emission profile into a monotonically increasing profile, for example.

A first LED module M1 and a second LED module M2 can be switched on/off by the controller 100. If the imaging arrangement implements two image sensors, each sensitive to the wavelength of one of the LED modules, the LED modules M1, M2 can be switched simultaneously and each image sensor may detect light from its corresponding LED module in an imaging step.

In some embodiments, the image sensor arrangement can comprise an image sensor for each LED module, such as a first image sensor for a first LED module, a second image sensor for a second LED module, etc. In such embodiments, each image sensor may detect light at the specific wavelength originating from its corresponding LED module. For example, if an LED module emits light at a wavelength of 850 nm, the corresponding image sensor may only detect light in this range. In embodiments with two LED modules, each emitting at a distinct wavelength range, the image sensor arrangement may comprise two corresponding image sensors. In such embodiments, the LED modules can be simultaneously switched on to illuminate the region in front of the camera, and the two image sensors may simultaneously record images of the scene. The image sensor outputs may then be evaluated.

In other embodiments, the image sensor arrangement may comprise a single image sensor that may detect light over the wavelength range of the illumination arrangement. For example, if the illumination arrangement comprises a first LED module emitting at 850 nm and a second LED module emitting at 960 nm, the image sensor may be sensitive to the wavelength range 850-960 nm. In such embodiments, the LED modules may be switched on one after the other so that the region in front of the camera may only be illuminated by a single LED module at any time, and the image sensor may record consecutive images of the scene. After each image capture, the image sensor output may be evaluated.

In the example illustrated in FIG. 1, a single image sensor 11S is used, and the single image sensor 11S is sensitive to the total wavelength range of the LEDs. In such embodiments, the LED modules M1, M2 may be switched on/off consecutively so that the image sensor 11S may detect light from a single LED module in an imaging step. Reflected light may be recorded at the image sensor 11S, which may be a one-dimensional array, such as a single row of 30 sensor pixels. The image sensor output 11_out may be passed to a processing unit 12 that may identify an intensity profile R1 for the received light that originated from the first LED module M1 and an intensity profile R2 for the received light that originated from the second LED module M2. These intensity profiles R1, R2 may be analyzed in a depth map generator, which can then determine the distance to an object and the position of that object solely on the basis of the intensity profiles R1, R2.

An intensity profile recorded by the image sensor may be understood to be a set of values, each intensity value recorded by a pixel of the image sensor. Because each LED module casts light in a particular manner into a field of view, the fingerprint of an LED module may determine the shape of the intensity distribution of the reflected light arriving at the image sensor. As described more herein, this rudimentary image information has been determined to be sufficient to determine the angular position of an object in a field of view. The distance to the object can be estimated from the phase difference between the emitted light and the received light after reflection by an object. An advantage of this may be that a reasonably informative but very simple depth map can be obtained in this way with favorably little effort. The inventive imaging arrangement can be realized in a very economical manner since it has no need of a 2D image sensor or any mechanically moveable elements in contrast to more complex and expensive solutions.

The LED modules can have any suitable emission profiles. As explained above, the angular emission profile of an LED may describe the distribution of the emitted light as a function of angle. Since an LED emission face is generally planar, the angular emission profile can in theory extend from −90° through 0° to +90°. In practice, light may not be emitted parallel to the emission face of an LED, and the angular emission profile of an LED may generally fall within a range such as −60° to +60°.

In embodiments, for example, the LED modules may have any two emission profiles that are based on linearly independent functions, such as linearly independent exponential functions. For example, the first LED module may have an angular emission profile that decreases monotonically or linearly as a function of angle over an angular range (e.g., most light emitted to one side, decreasing steadily from a first limit at one edge of an image sensor's pixel field of view to a second limit at the opposite edge of the image sensor pixel's field of view). For example, the first LED module may have an angular emission profile that commences with its maximum at −50° decreasing steadily to its minimum light output at +50°. The second LED module may have an angular emission profile that increases linearly as a function of angle over an angular range. For example, the second LED module may have an angular emission profile that commences with its minimum at −50°, increasing steadily to its maximum light output at +50°. In some embodiments, the angular emission of the first LED module may be a mirror image of the angular emission profile of the second LED module.

In embodiments, each LED module may be configured so that it casts most of its light into a specific region in the camera's field of view and the remaining small fraction of its light into the remainder of the field of view. In an embodiment with three LEDs, each may cast most of its light (e.g., more than 70%) into a third of the field of view. In some embodiments comprising two LED modules, an LED module may cast most of its light into one half of the field of view and scarcely illuminate the other half of the field of view.

Figure 2:
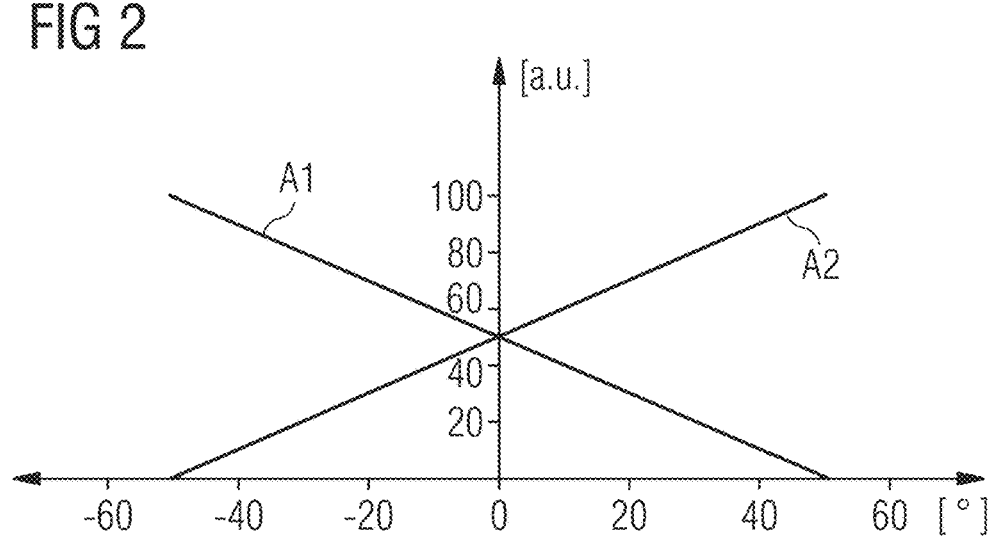
FIG. 2 is a graph showing an example of favorably straightforward angular emission profiles for the LED modules of FIG. 1.

FIG. 2 is a graph showing an example of favorably straightforward angular emission profiles A1, A2 for the LED modules M1, M2 of FIG. 1, with intensity (expressed in arbitrary units) along the Y axis and angle [°] along the X-axis. As shown in the graph of FIG. 2, the angular emission profile A1 of the first LED module M1 monotonously decreases as a function of angle θ. In other words, the intensity of the light decreases steadily from a first angular limit at −60° to a second angular limit at +60°. The maximum intensity is directed towards the left of the camera's field of view. The angular emission profile A2 of the second LED module monotonously increases as a function of angle θ In other words, the intensity of the light increases steadily from a first angular limit at −60° to a second angular limit at +60°. The maximum intensity of this LED module is directed towards the right of the camera's field of view.

Figure 3:
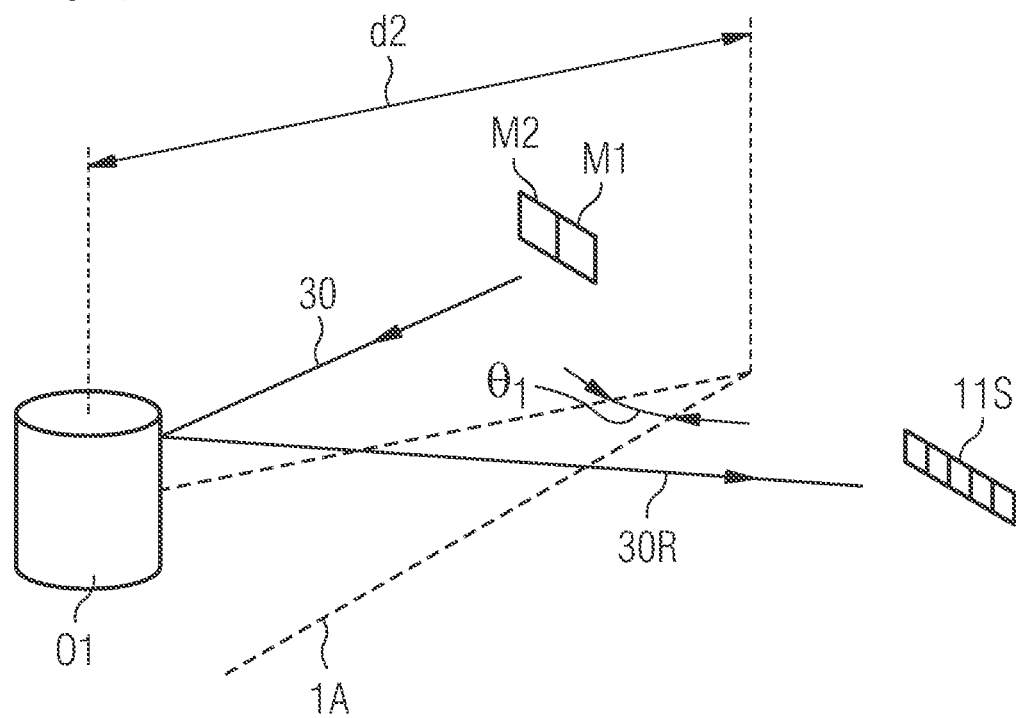
FIG. 3 is a diagram of an example of a scene that is to be imaged by the imaging system of FIG. 1.

FIG. 3 is a diagram of an example of a scene that is to be imaged by the imaging system 1 of FIG. 1. In the example illustrated in FIG. 3, a light ray 30 from an LED module (not shown) is reflected from an object O1 in the scene. The reflected ray 30R will reach the one-dimensional image sensor 11S and will be analyzed to determine the position of the object in the scene (e.g., its angular position $\theta_1$ relative to the optical axis of the camera 11 and/or its distance $d_2$ from the camera plane).

Figure 4:
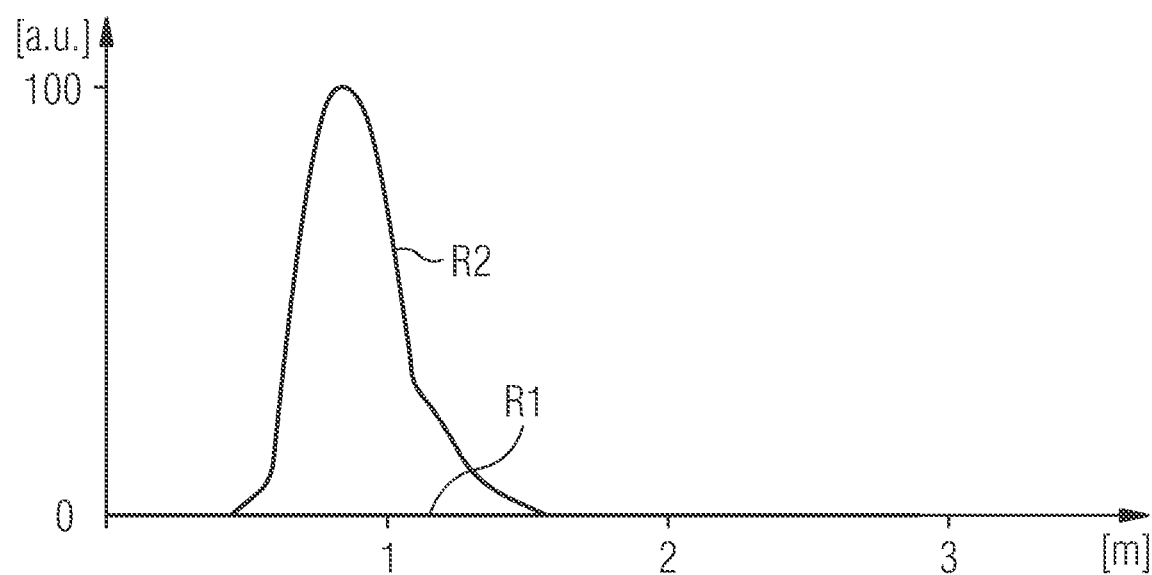
FIG. 4 is a graph showing how the data recorded by a pixel of the image sensor for the scene shown in FIG. 3 can be interpreted.

FIG. 4 is a graph showing how the data recorded by a pixel of the image sensor 11S for the scene shown in FIG. 3 can be interpreted. Each pixel may register an intensity value for light originating from a specific LED module as a function of the distance (e.g., to the surface from which the light was reflected) so that any reflected light originating from LED module M1 results in the intensity profile R1 and any reflected light originating from LED module M2 results in the intensity profile R2. In the graph of FIG. 4, the intensity is expressed in arbitrary units (Y-axis) against distance in meters (X-axis). In the graph of FIG. 4, only the intensity profile R2 is non-zero while the intensity profile R1 is flat. This means that light from LED module M1 is not reflected from any surface, so any object must be in the region illuminated by the second LED module M2. Since the first LED module M1 can only direct light towards the upper portion of the scene, it follows that there may be no objects in the region towards the top of the camera's field of view. The second curve R2 shows a maximum corresponding to a distance of 0.85 m. The angular position of the object may be deduced from the ratio of the intensity profiles R1, R2 at the maximum. In this case, the angular position of the object is determined to be at +50° (e.g., in the right-hand half of the field of view).

This analysis may be performed for each pixel of the image sensor so that a depth map can be compiled. The depth map for a scene may simply comprise this very rudimentary information since it may not be relevant how large the object is, whether it is bright or dark, etc., and the only information that may be relevant is its position and distance relative to the camera. In the embodiments described herein, the image content can be reduced to a very basic level (e.g., the phase shift between emitted and received light may be used to estimate distance and the intensity profiles may be used to deduce the angular position of an object in the field of view for each pixel) such that a rudimentary image can suffice.

Light may arrive at an image sensor after undergoing reflection by objects in the region in front of the camera. The intensity of light arriving at the image sensor arrangement may depend on various factors, such as the angular emission profile of the light source and object reflectivity. The spatial emission profile S of an LED may be a function of the radiometric flux $\Phi$ of the LED and the emission angle $\theta$ of the light. The reflectivity r of an object may determine the extent to which it absorbs/reflects light and may be expressed as a function of the wavelength of light $\lambda$ emitted by the light source. The intensity R of the reflected light arriving at the image sensor can therefore be expressed as the product of these functions:

$$R=f(\Phi,\theta)\cdot r(\lambda) \quad (1)$$

It may be assumed that the reflectively $r(\lambda)$ of an object may be essentially the same for wavelengths that are close together. For example, an object may be similarly reflective for an 850 nm LED and a 960 nm LED. It may also be assumed that the radiometric flux $\Phi$ of an LED can be established by measurement, for example at time of manufacture. Using two IR-LEDs with different wavelengths as described above, these assumptions may allow the ratio of the reflectivities R1, R2 of two LED modules to be expressed as:

$$\frac{R_1}{R_2} = \frac{f_1(\theta)}{f_2(\theta)} \quad (2)$$

where R1 is the reflectivity of a first LED module and R2 is the reflectivity of a second LED module.

By using LED modules with distinct spatial emission profiles, the intensity distributions as recorded by the image sensor arrangement may be sufficient to determine the position of an object in a scene.

If more than two LED modules are implemented, each emission profile may be distinct from a linear combination of the other two emission profiles (e.g., the emission profiles may be linearly independent). Such embodiments may deliver more information about the imaged scene and could be used to detect multiple objects in the camera's field of view.

In some embodiments, the sum of the angular emission profiles may be constant. For example, for any angular position, the sum of $f_1(\theta)$ and $f_2(\theta)$ may be essentially constant. In this case, the distance to an object can be obtained from a phase difference, and the angular position of an object in a scene can be determined from the ratio given in equation (2) above.

Figure 5:
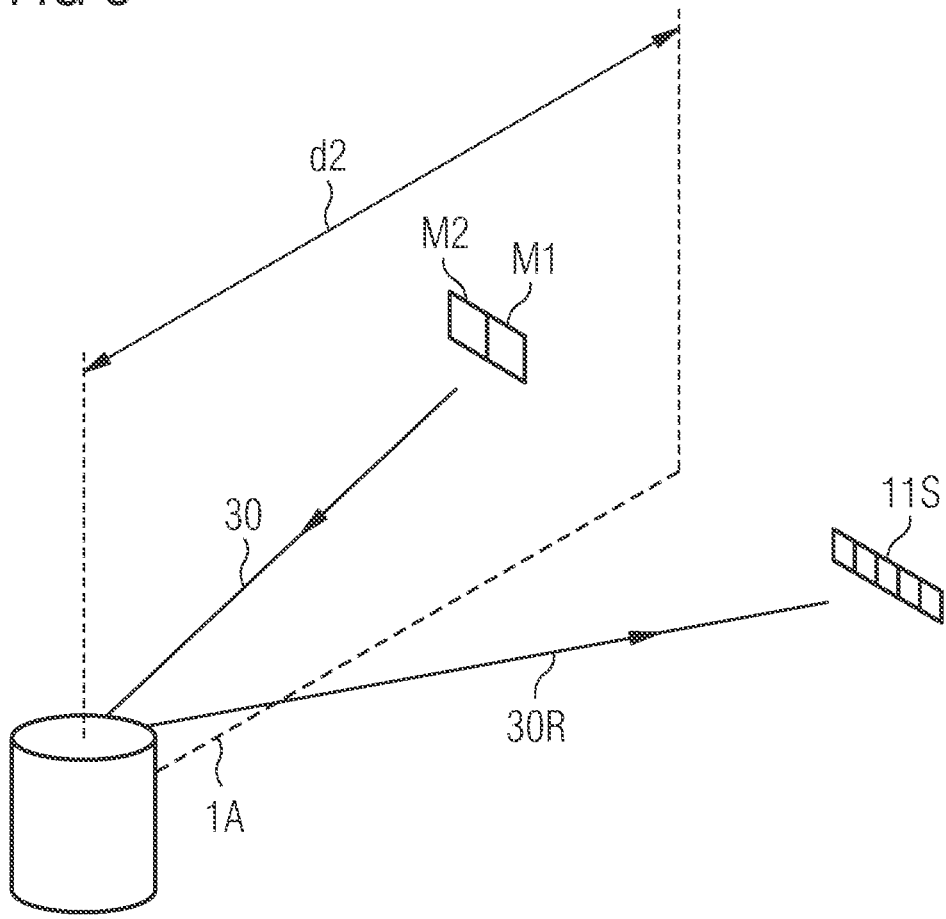
FIG. 5 is a diagram of another example of a scene that is to be imaged by the imaging system of FIG. 1.
Figure 6:
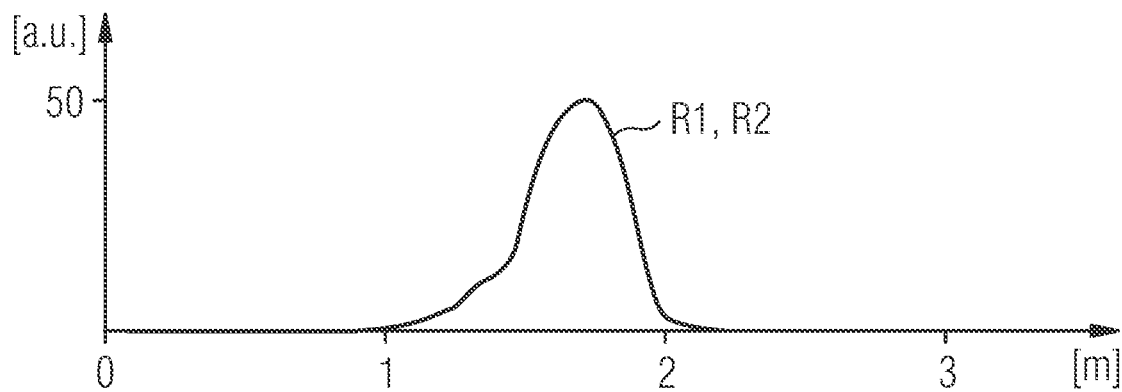
FIG. 6 is a graph showing the intensity profiles for the scene of FIG. 5.

FIG. 5 is a diagram of another example of a scene that is to be imaged by the imaging system 1 of FIG. 1. FIG. 6 is a graph showing the intensity profiles R1, R2 for the scene of FIG. 5. Here, both intensity profiles R1, R2 are essentially the same, indicating an angular position of essentially 0° for the object O2. In other words, in the scene of FIG. 5, the object O2 is straight ahead of the camera. The distance $d_2$ to the object O2 can be determined, as explained above. Here, the object is determined to be at a distance $d_2$ of about 1.5 m from the camera.

Figure 7:
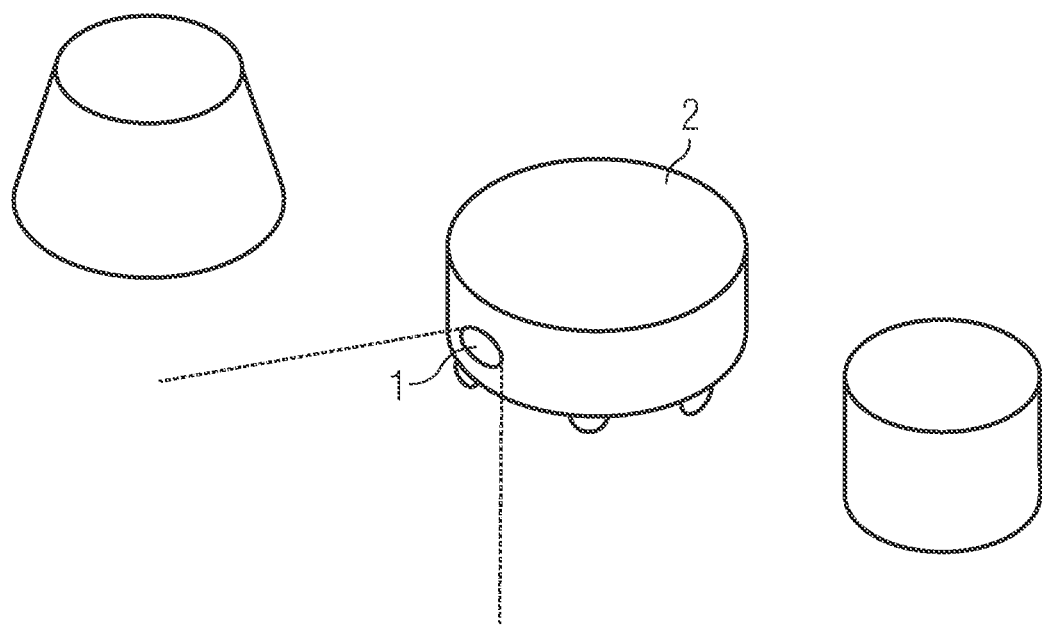
FIG. 7 is a diagram an example autonomous robotic household appliance.

FIG. 7 is a diagram of an example autonomous robotic household appliance 2 comprising an embodiment of the imaging arrangement 1 as described above. The robotic household appliance 2 can continually obtain images of the region in front of its camera and can make decisions regarding a possible path to take on the basis of objects detected in its field of view. In embodiments, for example, the controller 100 or some other controller in the robotic household appliance 2 may control the LED modules M1 and M2 to turn on and off as described above and may continually do so while the autonomous robotic household appliance 2 is turned on or is running a particular program. The controller may also control the camera 11 and/or the processor 12 and/or the depth map generator 13 to continually compute a depth map and determine whether an object is in the field of view of the camera. The autonomous appliance 2 only needs to know whether there is an object that it must avoid. A simple one-dimensional image sensor is sufficient for this purpose, and it only needs to have a field of view that covers the region ahead of the appliance 2 in order to plan its route as it moves autonomously.

Figure 8:
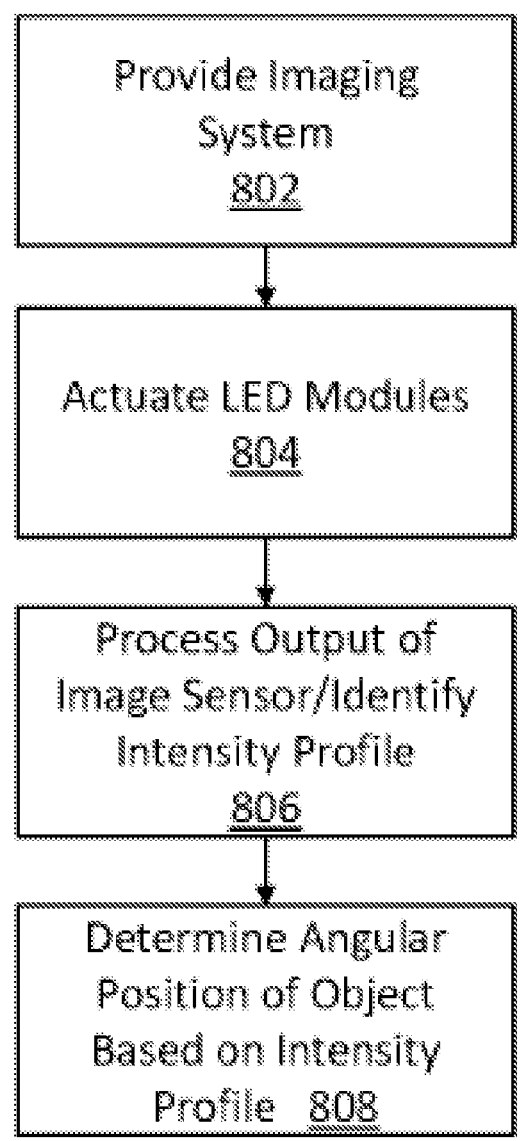
FIG. 8 is a flow diagram of an example method of generating a depth map.

FIG. 8 is a flow diagram of an example method of generating a depth map using, for example, an imaging system such as the TOF imaging arrangement of FIG. 1. In the example illustrated in FIG. 8, an imaging system is provided (802). In embodiments, the imaging system may be any of the imaging systems described herein and may include, for example, multiple LED modules, each having a distinct angular emission profile and configured to emit light having a distinct wavelength range. In some embodiments, the imaging system may also include a single image sensor configured to detect light originating from at least two of the LED modules after reflection by an object in a field of view of the single image sensor to provide an image sensor output.

The method may further include actuating the LED modules (804). In some embodiments, each of the LED modules may be turned on and off such that only one of the LED modules emits light at the same time to illuminate a field of view of the image sensor. An output of the image sensor may be processed to identify an intensity profile for light originating from each of the LED modules (806). An angular position of an object may be determined based on the intensity profile (808). The object may be an object in a field of view of the image sensor. The intensity profile may be for the light originating from each of the LED modules.

Having described the embodiments in detail, those skilled in the art will appreciate that, given the present description, modifications may be made to the embodiments described herein without departing from the spirit of the inventive concept. Therefore, it is not intended that the scope of the invention be limited to the specific embodiments illustrated and described.

What is claimed is:

1. An imaging system comprising:
    a single image sensor configured to detect light within a field of view of the single image sensor to provide an image sensor output;
    a plurality of LED modules, each of the plurality of LED modules having a distinct angular emission profile within the field of view of the single image sensor and configured to emit light having a distinct wavelength range such that the plurality of LED modules collectively emit light over the entire field of view of the single image sensor, wherein the plurality of LED modules comprises a first LED module having an angular emission profile that decreases monotonically as a function of angle and a second LED module having an angular emission profile that increases monotonically as a function of angle;
    a controller configured to control the plurality of LED modules to turn on and off such that only one of the plurality of LED modules emits light at the same time;
    a processing unit configured to process the image sensor output to identify an intensity profile for the reflected light from each of the plurality of LED modules; and a depth map generator configured to determine an angular position of the object based at least on the intensity profile for the reflected light from each of the plurality of LED modules.

2. The imaging system according to claim 1, wherein the single image sensor is a one-dimensional image sensor.

3. The imaging system according to claim 2, wherein the one-dimensional image sensor is oriented horizontally relative to the object.

4. The imaging system according to claim 3, wherein a combined light emission from each of the plurality of LED modules covers an entire field of view of the one-dimensional image sensor.

5. The imaging system according to claim 1, wherein the angular emission profile of the first LED module is an inverse of the angular emission profile of the second LED module.

6. The imaging system according to claim 1, wherein a maximum light intensity of the first LED module is directed into a left half of the field of view of the single image sensor, and a maximum light intensity of the second LED module is directed into a right half of the field of view of the single image sensor.

7. The imaging system according to claim 1, further comprising a plurality of optical elements, each of the plurality of optical elements being optically coupled to a respective one of the plurality of LED modules, and the angular emission profile of each of the plurality of LED modules is determined by the optical element optically coupled to that LED module.

8. The imaging system according to claim 1, wherein the single image sensor is sensitive over an entire wavelength range of all of the plurality of LED modules.

9. The imaging system according to claim 1, wherein the depth map generator is configured to estimate a distance to the object based on a phase difference between light emitted by each of the plurality of LED modules and light received by the single image sensor.

10. A method of generating a depth map, the method comprising:
   providing an imaging system comprising:
      a single image sensor configured to detect light within a field of view of the single image sensor to provide an image sensor output,
      a plurality of LED modules, each of the plurality of LED modules having a distinct angular emission profile within the field of view of the image sensor and configured to emit light having a distinct wavelength range such that the plurality of LED modules collectively emit light over the entire field of view of the single image sensor, wherein the plurality of LED modules comprises a first LED module having an angular emission profile that decreases monotonically as a function of angle and a second LED module having an angular emission profile that increases monotonically as a function of angle, and
   actuating each of the plurality of LED modules to turn on and off such that only one of the plurality of LED modules emits light at the same time to illuminate the field of view of the single image sensor;
   processing an output of the single image sensor to identify an intensity profile for light originating from each of the plurality of LED modules; and
   determining an angular position of the object based on the intensity profile for the light originating from each of the plurality of LED modules.

11. The method according to claim 10, wherein the determining the angular position of the object comprises determining the angular position of the object from a maximum amplitude of the identified intensity profile.

12. The method according to claim 10, further comprising determining a distance to the object based at least on a phase difference between light emitted by at least one of the plurality of LED modules and light received by the single image sensor.

13. The method according to claim 10, further comprising recording intensity levels of the reflected light at the single image sensor.

14. An autonomous robotic appliance comprising:
   a single image sensor configured to detect light within a field of view of the single image sensor to provide an image sensor output;
   a plurality of LED modules, each of the plurality of LED modules having a distinct angular emission profile within the field of view of the single image sensor and configured to emit light having a distinct wavelength range such that the plurality of LED modules collectively emit light over the entire field of view of the single image sensor, wherein the plurality of LED modules comprises a first LED module having an angular emission profile that decreases monotonically as a function of angle and a second LED module having an angular emission profile that increases monotonically as a function of angle;
   at least one controller configured to:
      control the plurality of LED modules to continually turn on and off such that only one of the plurality of LED modules emits light at the same time, and
      control the single image sensor to continually detect the light originating from the at least two of the plurality of LED modules;
   a processing unit configured to continually process the image sensor output, responsive to a control signal provided by at least one of the at least one controller, to continually identify intensity profiles for the reflected light from each of the plurality of LED modules; and
   a depth map generator configured to continually determine an angular position of the object based at least on the intensity profile for the reflected light from each of the plurality of LED modules,
   the at least one controller further configured to control a path of the autonomous robotic household appliance based at least on the determined angular position of the object.

15. The autonomous robotic appliance of claim 14, wherein the single image sensor is a one-dimensional image sensor.

16. The autonomous robotic appliance of claim 15, wherein the one-dimensional image sensor is oriented horizontally relative to the object.

17. The autonomous robotic appliance of claim 16, wherein a combined light emission from each of the plurality of LED modules covers an entire field of view of the one-dimensional image sensor.

18. The autonomous robotic appliance of claim 14, wherein the angular emission profile of the first LED module is an inverse of the angular emission profile of the second LED module.

* * * * *